Patented Feb. 10, 1942

2,272,294

UNITED STATES PATENT OFFICE 2,272,294

LAMINATED MATERIALS

Donald Finlayson, Spondon, near Derby, England, assignor to Celanese Corporation of America, a corporation of Delaware No Drawing. Application July 18, 1939, Serial No. 285,114. In Great Britain July 23, 1938

2 Claims. (Cl. 154—2)

This invention relates to improved laminated materials particularly laminated fabrics suitable for the manufacture of stiff or semi-stiff collars, cuffs and like articles, and to the production of such fabrics and articles.

Laminated fabrics of the kind referred to above can be made by interleaving between layers of fabric adapted to provide the outer surfaces of the collar, cuff or the like an interlining containing thermoplastic material and uniting the several layers under heat and pressure in the presence of a liquid adapted to render the thermoplastic material adhesive at the pressing temperature. The interlining may be a non-thermoplastic fabric, e. g. cotton, doped with the thermoplastic material or may even be a film of said material if permeability to air and moisture is not required but it is of great advantage to employ as an interlining a fabric containing yarns of thermoplastic material, e. g. cellulose acetate particularly in admixture with yarns of non-thermoplastic material, e. g. cotton, linen or regenerated cellulose. The proportion of thermoplastic yarn to non-thermoplastic in such a lining can be varied according to the permeability or stiffness required in the collars, cuffs or the like.

When applying the method referred to above to the production of white collars, cuffs, fronts or the like it is not always easy to ensure such whiteness of the laminated articles that they match the white unstiffened shirting or other material to which they are to be attached or in conjunction with which they are to be used. Thus the thermoplastic materials available for such processes, although they may appear white when viewed alone, require slight colour correction when compared with the whiteness of the facing fabric. Even the use of white pigments in the interlining does not altogether remove this difficulty.

I have now found that an excellent degree of whiteness in the laminated products, which obviates any difficulty in matching, can be obtained by first bleaching the interlining material and then tinting it with a blue dye having an affinity for the material of the interlining. When the interlining contains two materials of different dye affinities it is preferable to employ a mixture of dyes, one or more having a substantive affinity for one of the materials and one or more for the other material. Thus, for instance, in the case of an interlining consisting of cotton in admixture with cellulose acetate the tinting may be effected by means of a bath containing one or more blue dyes of the direct cotton class and one or more dispersed insoluble dyes having an affinity for the cellulose acetate. Preferably, after the colouration the two components should match closely. The use of a mixture of dyes for one of the components or even for both in some cases facilitates matching.

The dyes selected should preferably be sufficiently fast to light and washing, to the assisting liquids used in uniting the fabric layers, and to any plasticizers or the like present, at the elevated temperature at which pressing is generally effected as well as at lower temperatures, to avoid any appreciable colour change during transport or storage of the interlining or during production or use of the laminated fabrics or fabric articles. As examples of plasticizers which may be present in the interlining or in the assisting liquid, mention may be made of triacetin, formal glycerol, dimethyl tartrate, dibutyl tartrate, dibutyl phthalate and methyl cellosolve phthalate. The assisting liquid may comprise a 70–80% aqueous solution of methanol or ethanol containing a small proportion of one or more of such plasticizers or the water in such a mixture may be replaced by a non-aqueous liquid such as acetone, as described in British Application No. 9203/38, filed March 25, 1938.

Dyes for the cotton or other cellulosic components of the interlining include Chlorazol Blue B and 3B, Direct Blue 3R, Benzo Blue BX and Chlorantine Fast Blue GLL. For the cellulose acetate component mention may be made of Celliton Fast Blue FFG and of 1,4 di(phenylamino) anthraquinone, 1-4 di(methylamino) anthraquinone, 1-amino-4-methylamino anthraquinone, 1-methylamino-4-phenylamino anthraquinone, 1-amino-4-phenylamino anthraquinone, 1-amino-4-p-tolylamino anthraquinone, 1-methylamino-4-p-tolylamino anthraquinone, 1-methylamino-4-oxyanthraquinone, 1-oxyethyl-amino-4-p-tolylamino anthraquinone, 1-oxyethylamino-4-phenylamino anthraquinone, and 1-amino-4-cyclohexylamino anthraquinone - 2 - carboxylic amide.

The fastness and affinity of the cellulose ester dye appear to be of more importance than of the cotton dye and it may even be practicable in some cases to omit the cotton dye, particularly when the interlining is woven with particular regard to bringing the cellulose ester yarns to the surface as described, for example, in U. S. Patent No. 2,158,112.

In carrying out the process of the invention, the interlining fabric is first scoured, then bleached, e. g. with hypochlorite, washed and treated with an antichlor, e. g. sodium sulphite. The bleached fabric is then tinted in a very dilute bath containing the desired blue dye or dyes. When two or more dyes are used in tinting these may be applied from the same bath, e. g. a single bath may be used containing a cotton dye such as Chlorantine Fast Blue GLL in admixture with one or more of the blue amino anthraquinone dyes specified above. The winch or jig methods may conveniently be used both in the bleaching and in the tinting.

The following examples illustrate the invention:—

Example 1

A fabric intended for use as an interlining for white, semi-stiff collars is composed of bleached cotton yarns in admixture with yarns of cellulose acetate, the proportion of cotton to cellulose acetate in the fabric being about 2 : 1.

The fabric is first scoured by steeping in hank or reel form or continuously, in a solution containing 5 grs. of soap per litre. It is rinsed on the winch and bleached for half an hour with sodium hypochlorite, the temperature being raised to 60° C. during this period. The fabric is then washed and treated with sodium sulphite to neutralise residual chlorine.

The bleached fabric is tinted for about one hour in a warm solution containing in 4000 litres 1 gram of Chlorantine Blue GLL and 0.1 gram of 1-methylamino-4-oxyanthraquinone dispersed with the aid of Turkey Red oil. This volume of solution is used to tint 250 lbs. of fabric. The bleached and tinted fabric is washed and is then ready for finishing.

Example 2

A fabric of the same construction as that referred to in Example 1 is scoured, bleached with hypochlorite, treated with sodium sulphite as an antichlor, and tinted, all on the jig.

The tinting bath contains, on the weight of the fabric, 0.017% Celliton Fast Blue FFG, 0.0048% of 1-amino-4-phenylamino-anthraquinone dispersed with the aid of Turkey Red oil, and 0.0055% Chlorantine Fast Blue GLL. After washing at about 60° C. the fabric is ready for finishing.

Example 3

A fabric in containing about 2 parts of cotton to one of cellulose acetate, the yarns of cellulose acetate forming floats on both sides of the fabric, as described in U. S. Patent No. 2,158,112, is treated as in Examples 1 or 2, except that the cotton dye is omitted from the tinting bath.

The invention has been described with particular reference to the use of cellulose acetate as the thermoplastic constituent of the interlining. Other suitable thermoplastic materials can be used, however, especially organic derivatives of cellulose, e. g. cellulose propionate, butyrate, acetopropionate, acetobutyrate and acetonitrate, and methyl, ethyl, and benzyl celluloses, vinyl esters and ethers and similar non-thermo-setting synthetic resins, e. g. of the acrylic and methacrylic series.

Having described my invention, what I desire to secure by Letters Patent is:

1. Process for the manufacture of white stiffened fabrics and fabric articles, which comprises uniting under heat and pressure a white fabric interlining containing yarns of cotton in admixture with yarns of cellulose acetate to a white facing fabric, said interlining being bleached, and tinted to match the whiteness of the facing fabric with a blue dye having an affinity for the cellulose acetate, said dye being selected from the class consisting of derivatives of 1:4-diamino-anthraquinone and derivatives of 1:4-amino-oxy-anthraquinone, in admixture with a blue dye having an affinity for the cotton material, before union.

2. A white fabric suitable for use as an interlining or backing in the production of stiffened fabrics and fabric articles by uniting under heat and pressure a facing fabric to a fabric interlining or backing fabric containing a thermoplastic material, said interlining or backing fabric containing filaments, fibers or yarns of cellulose acetate in admixture with filaments, fibers or yarns of cellulose and being bleached, and tinted to whiteness by means of a blue dye having an affinity for the cellulose acetate, said dye being selected from the class consisting of derivatives of 1:4-diamino-anthraquinone and derivatives of 1:4-amino-oxy-anthraquinone, and with a blue cotton dye.

DONALD FINLAYSON.